May 15, 1956 B. G. PRICE 2,746,012
INDUCTIVE ELECTROMAGNETIC INSPECTION
Filed April 17, 1952 2 Sheets-Sheet 1

Berry Glenn Price
INVENTOR.

BY Thomas O Arnold

ATTORNEY

May 15, 1956 B. G. PRICE 2,746,012
INDUCTIVE ELECTROMAGNETIC INSPECTION
Filed April 17, 1952 2 Sheets-Sheet 2

Berry G. Price
INVENTOR.

BY Thomas O Arnold

ATTORNEY

United States Patent Office 2,746,012
Patented May 15, 1956

2,746,012
INDUCTIVE ELECTROMAGNETIC INSPECTION

Berry Glenn Price, Houston, Tex., assignor, by mesne assignments, to Tuboscope Company, Harris County, Tex., a corporation of Delaware Application April 17, 1952, Serial No. 282,743

3 Claims. (Cl. 324—37)

This invention relates to electromagnetic inspection of ferromagnetic materials, and more particularly to improvements in inductive electromagnetic inspection of pipe for fatigue defects. "Ferromagnetic" is used herein to describe products of nickel and cobalt as well as of iron.

The pattern of the magnetic field surrounding a given piece of pipe, such as oil well drill pipe, when magnetized, reflects all the history of the given length of pipe, including the rolling of the solid metal into pipe form, variations in hardness, surface variations due to handling, abrasive wear or corrosion, fatigue cracks and other structural and metallurgical conditions.

Attempts have been made to determine the condition of an existing piece of pipe by analysis of the general magnetic pattern of the pipe. This analysis has sometimes been made, as in this invention, by passing a pickup coil along a length of magnetized pipe, thereby inducing in the coil electric voltages which are proportional to variations in the magnetic field surrounding the pipe, and recording these voltages on a tape by means of a recording galvanometer. Those skilled in the art may study such a tape and learn certain things about the subject length of pipe.

However, the general magnetic pattern of drill pipe is complex and in prior devices indications of conditions in the pipe which do not materially affect the strength of the pipe are received in approximate balance with fatigue indications. For example, slightly abnormal hardness variations which do not materially affect the ability of the pipe to absorb working stress, give indications which resemble in amplitude and shape the indications derived from some fatigue induced defects which do materially reduce the ability of the pipe to absorb working stress.

This situation has made it impossible, when using any previously existing device, for an operator to detect minute fatigue cracks, and to determine the size and character of fatigue cracks while distinguishing them from other pipe conditions. Primary among the problems unsolved by prior devices is the problem of distinguishing fatigue crack indications from ring groove indications, and of detecting responses to fatigue cracks which are hidden among responses to what will be termed the natural magnetic pattern of the pipe. This inventor has discovered that one of the component parts of the overall general magnetic pattern of the field surrounding a length of magnetized pipe is this natural magnetic pattern, and that this natural magnetic pattern appears to be sinusoidal along the length of the pipe, but is actually helical, the nodes in the sinusoidal wave forming a line moving around the pipe as well as along it.

An object of this invention is to provide improved means for locating and evaluating fatigue induced defects in pipe.

Another object of this invention is to provide a means for suppressing indications of natural or normal conditions while emphasizing fatigue defects, or conversely emphasizing the natural magnetic pattern at the expense of fatigue indications.

A further object of this invention is to provide improved means for distinguishing fatigue defects from ring grooves.

Still another object of this invention is to provide an improved device for electromagnetic inspection particularly adapted for pipe.

Other objects will be apparent upon reference to the following description and accompanying drawings, wherein.

This invention is a device which makes possible for the first time, a detailed inspection of the magnetic field surrounding a length of magnetized pipe. As previously stated this is accomplished by recording variations in voltage induced in pickup coils which are moved along the length of pipe. One of the principles underlying this invention is that of obtaining response from fatigue cracks which is unopposed by any other response, while obtaining an opposition response to any indications which are undesirable. One of the observations made and appreciated by this inventor which made it possible to apply this principle is that fatigue cracks which are not easily detectable by means other than inductive electromagnetic inspection, have been found to have a maximum length on the order of ¾ inch. The importance of this fact will be apparent from the following description.

Figure 5:
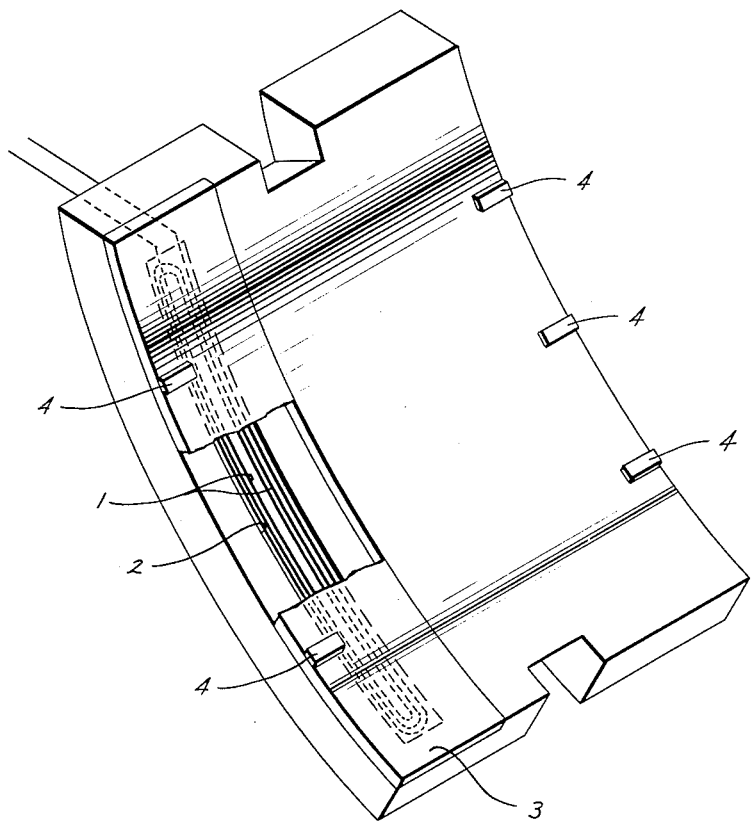
Figure 5 is a preferred form of shoe.

The size and structure of the coils is important, a preferable coil being one wound from No. 44 wire, of hairpin shape 1½ inches long with a short inside diameter of .01 inch and curved to fit the surface of the pipe. Preferably each coil is mounted in an individual shoe which is curved to fit the surface of the pipe, and which is resiliently urged against the pipe so that the entirety of the coil is positioned within .060 inch of the pipe. A preferred form of shoe is illustrated in Figure 5 wherein a coil 1 is shown positioned in a recess 2 which is covered by thin non-magnetic foil 3. Tungsten carbide points 4 may be positioned on the inside surface of the shoe to absorb the wear incident to movement of the shoes along the pipe. The shoes may be a part of a carriage which is adapted to be moved along a length of pipe at speeds ranging from about 20 to 150 feet per minute.

Figure 1:
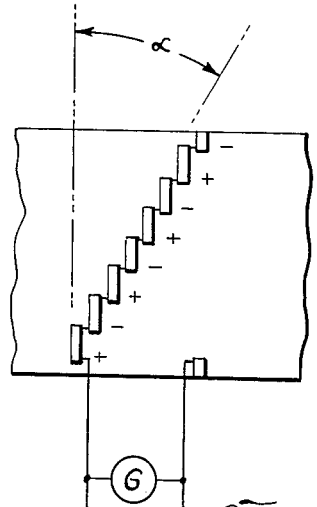
Figure 1 is a layout of a length of pipe with a schematic representation of one version of a magnetic pickup arrangement.

This invention contemplates the arrangement of coils in either of several particular manners illustrated in the drawings, the length of the coils extending circumferentially around the pipe. In one embodiment, a single series of coils is used as illustrated in Figure 1. The centers of each coil form a line at an angle, alpha, alpha being the helix angle of the natural magnetic pattern of the pipe. Upon looking at the pipe from the end it is seen that the end of each coil overlaps the end of the adjacent coils slightly. Each successive coil is connected in a sense opposing that of adjacent coils as indicated by the plus and minus signs on the drawing.

As the coils are moved along the pipe, any coil which passes over a fatigue crack will register the flux variation which surrounds it. Since every coil will encounter a ring groove, but will encounter it at different times, there will be successive indications of the groove as successive coils pass over it. It is thus easily identified and distinguished from fatigue cracks which, due to their short length, will never be recorded by more than two coils, and which are not likely to be recorded by more than one.

Since the successive coils will encounter variations in the natural magnetic pattern of the pipe simultaneously, and since the voltage generated in each coil from this source opposes that generated in the adjacent coil, no substantial response to the natural magnetic pattern of the pipe will be recorded. In prior devices excessive response to this natural magnetic pattern so confuses the record that it is usually impossible to detect indications of small fatigue cracks.

This arrangement of coils has a further advantage. If all of the coils are connected in the same sense, so that signals generated in each coil will add to that generated in the other coils the natural magnetic pattern will be accentuated for easy study.

Figure 2:
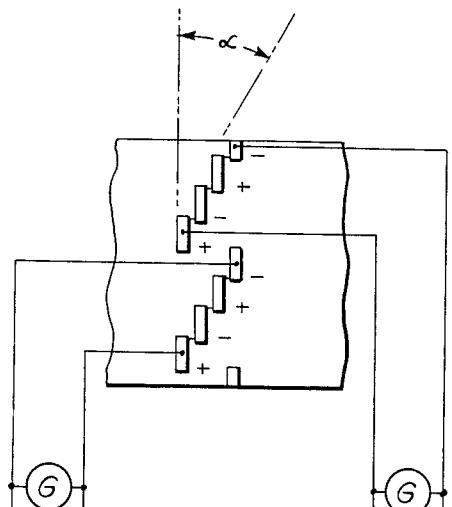
Figure 2 is a layout of a length of pipe with a schematic representation of a modified version of magnetic pickup arrangement which is the functional equivalent of that illustrated in Figure 1.

In the alternative, there may be two series of coils of the type previously described, each extending only one half of the way around the pipe, and each connected to a different recording galvanometer. This arrangement is illustrated in Figure 2. A yet more preferred version is to use a sufficiently large number of series of coils that no series need contain more than two coils, each series being connected to a separate recording galvanometer. Preferably the chart of indications obtained from each series is prepared on a single tape, the various recordations being one beneath the other for ready comparison. Other alternatives may include embodiments which do not completely surround the pipe, but which will inspect only one side of the pipe at a time. In such embodiments two-coil series will be most practical.

Figure 3:
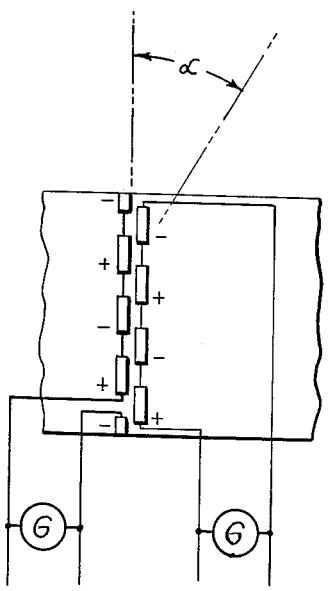
Figure 3 is also a layout illustrating a second embodiment of the invention.

When it is important to detect small fatigue flaws within ring grooves, it becomes important to minimize the response to such grooves. In accordance with this invention, this may be acomplished by the arrangement illustrated in Figure 3. There are two series of coils, each series connected to a different galvanometer, and each series disposed in different planes which are perpendicular to the pipe. The individual coils of each series are spaced apart and extend circumferentially around the pipe. The coils in the second series should be positioned in line, axially of the pipe, with the spaces between the coils of the first series. Each coil in a series is connected in a sense to oppose the adjacent coil in the same series. Since all coils in a single series will encounter the ring groove at the same time, and each coil will have generated therein a signal which is opposed by a substantially equal signal in the adjacent coil, there will be substantially no response to the ring groove, while the full indication of a fatigue crack will be recorded.

Figure 4:
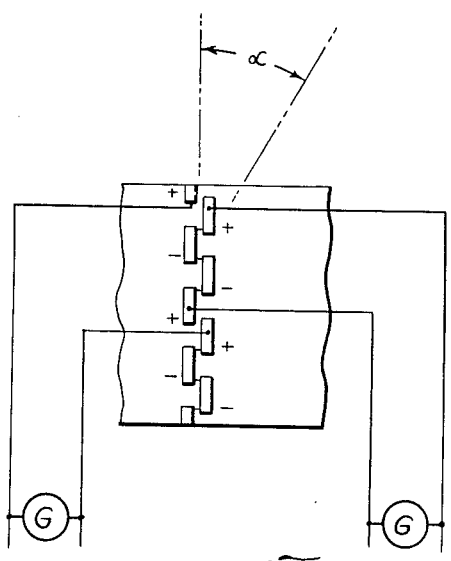
Figure 4 is likewise a layout of a pickup arrangement and circuit which functionally is a combination of the embodiments illustrated in Figures 2 and 3.

In accordance with this invention, the coils of the second series are preferably disposed from the coils of the first series at an angle equal to the helix angle of the natural magnetic pattern. With this arrangement the coils may be connected in series of four, as illustrated in Figure 4, each series containing two pairs along the helix line, individual coils in each pair being connected with opposing senses so that the series gives no response to the natural magnetic pattern, and two pairs along any ring groove with individual coils in each pair being connected with opposing senses so that the series gives no response to ring grooves, while at the same time a fatigue defect will still be indicated in its true character by each coil which passes over it.

It is apparent from the coil connections detailed above, that these connections are adapted to effect comparisons of the signals induced in select coils or groups of coils. When two coils are connected together in opposing senses and the resultant signal recorded, the resultant signal is itself an indication of the comparison. When signals derived from two coils, or from two series of coils, are separately recorded, the comparison is recorded in the form of the difference between the two recorded signals. Other means for comparison will be apparent to those skilled in the art.

The same arrangements of coils may be used inside pipe as those above described for external mounting. In such manner the same inspection may be made from inside the pipe as has been previously described from the outside.

It will be understood the invention is applicable to cylindrical bars and other similar shapes as well as pipe, and that modifications can be made in the invention as herein described without departure from the spirit thereof, and therefore, that the description is to be construed as illustrative only.

I claim:

1. In apparatus adapted for electromagnetic detection of flaws in pipe having a natural magnetic pattern of helical form, a group of four coils, the second and fourth of said four coils respectively being adapted to be disposed circumferentially around said pipe from the first and third of said coils, and the third and fourth of said four coils being adapted respectively to be disposed on helical lines from said first and second of said coils, the helix angle of said helical lines being substantially equal to the helix angle of the natural magnetic pattern of said pipe, said first and four coils being connected in opposing senses to said second and third coils.

2. In apparatus adapted for the electromagnetic detection of conditions in pipe having a natural magnetic pattern of generally helical form, at least two series of pick up coils, the coils of each of said series being disposed so as to extend around said pipe in a circumferential direction, each coil in the second of said series being disposed with respect to a coil of the first of said series, along a helical line having the same helix angle as the natural magnetic pattern of said pipe, adjacent coils in each series being wound in opposing senses and adjacent coils along a helical line being also wound in opposing senses, and said coils being adapted for movement relative to said pipe whereby variations in magnetic flux emanating from the surface of said pipe are detected by variations in voltages induced in said pick up coils; and means for comparing the voltages induced in predetermined groupings of said coils.

3. In apparatus adapted for the electromagnetic detection of conditions in pipe having a natural magnetic pattern of generally helical form, at least two series of pick up coils, the coils of each of said series being disposed so as to extend around said pipe in a circumferential direction, each coil in the second of said series being disposed with respect to a coil of the first of said series, along a helical line having the same helix angle as the natural magnetic pattern of said pipe; half of the coils in each series being wound in a sense opposing the windings of the other half of the coils in the same series, and half of the coils along a single helical line being also wound in a sense opposing the other half of the coils along a helical line; said coils being adapted for movement relative to said pipe whereby variations in magnetic flux emanating from the surface of said pipe are detected by variations in voltages induced in said pick up coils; and means for comparing the voltages induced in predetermined groupings of said coils.

References Cited in the file of this patent

UNITED STATES PATENTS

| | | |
|---|---|---|
| 1,933,547 | Drake et al. | Nov. 7, 1933 |
| 2,124,579 | Knerr et al. | July 26, 1938 |
| 2,594,332 | McKee et al. | Apr. 29, 1952 |